(12) United States Patent
Anderson et al.

(10) Patent No.: US 12,306,666 B2
(45) Date of Patent: May 20, 2025

(54) ELECTRONIC DEVICE AND METHOD OF MANAGING FIELD OF VIEW BASED ON DISPLAY ORIENTATION

(71) Applicant: LENOVO (SINGAPORE) PTE. LTD., Singapore (SG)

(72) Inventors: Ellis Anderson, Greensboro, NC (US); Jeffrey E. Skinner, Raleigh, NC (US); Lincoln Hancock, Raleigh, NC (US); Rebecca Megan Frankosky, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 193 days.

(21) Appl. No.: 18/049,357

(22) Filed: Oct. 25, 2022

(65) Prior Publication Data

US 2024/0137651 A1 Apr. 25, 2024
US 2024/0231421 A9 Jul. 11, 2024

(51) Int. Cl.
*G06F 1/16* (2006.01)

(52) U.S. Cl.
CPC .... *G06F 1/1605* (2013.01); *G06F 2200/1637* (2013.01)

(58) Field of Classification Search
CPC .... H04N 21/40; H04N 23/698; H04N 23/633; H04N 7/183; H04N 23/631; H04M 1/72412; H04M 2250/52; G02B 27/0176; G02B 2027/014; G02B 27/017; G06T 19/006; F41G 3/2694; F41G 3/2633
USPC ..................................... 361/679.01; 396/374
See application file for complete search history.

(56) References Cited

U.S. PATENT DOCUMENTS

| | | | | |
|---|---|---|---|---|
| 2002/0085843 | A1* | 7/2002 | Mann | E03C 1/057 396/374 |
| 2014/0347794 | A1* | 11/2014 | Pombo | G02B 27/0176 361/679.01 |
| 2022/0364829 | A1* | 11/2022 | Wallack | F41G 3/2633 |

\* cited by examiner

*Primary Examiner* — Xi Wang
(74) *Attorney, Agent, or Firm* — Dean D. Small; The Small Patent Law Group, LLC (57) ABSTRACT

An electronic device includes a housing, a camera system, one or more display devices, and one or more processors. The one or more display devices are coupled to the housing and configurable in multiple different orientations relative to the housing. The one or more processors determine a current orientation of the one or more display devices relative to the housing, and determine an effective field of view (FOV) of a surrounding environment based on the current orientation of the one or more display devices. The one or more processors perform image analysis on a set of image data generated by the camera system. The set of image data is limited to the effective FOV.

18 Claims, 3 Drawing Sheets

ELECTRONIC DEVICE AND METHOD OF MANAGING FIELD OF VIEW BASED ON DISPLAY ORIENTATION

FIELD

The present disclosure generally relates to devices that generate image data and analyze the image data, such as devices used for video conferencing.

BACKGROUND OF THE INVENTION

Some camera systems are designed to generate image data that captures large portions of the surrounding environment. For example, some camera systems are 360-degree camera systems that capture the full environment surrounding the camera system. Some large field-of-view imaging devices are designed to be placed at the center of a table or room and to generate image data that depicts objects around the table and/or room surrounding the imaging device. These "center-of-table" devices can be used for video conferencing (e.g., virtual meetings), as the devices have camera systems that can capture people positioned around the table and/or the room. The center-of-table devices may have microphones for receiving spoken words and other audio from the room, speakers for outputting audio generated by remote devices outside of the room, and one or more display devices for outputting video feeds from the remote devices.

Although large field-of-view imaging devices may be capable of capturing a majority or even an entire 360-degree view of the surrounding environment, only a portion of the available field may contain objects that are relevant to a particular task. For example, if all of the people within a room participating in a video conference are sitting on the same, first side of a table that supports a center-of-table imaging device, image data depicting the second side of the table may be irrelevant. The center-of-table imaging device may include one or more processors that perform image analysis on the image data generated by the camera system, such as to detect and identify people in the image data. Performing image analysis on a full 360-degree field of image data, when only a subset of the image data depicts relevant information for a given task, may represent an undue burden on the processors. The large processing load on the processors may result in slow processing times, errors or faults, and/or damage to the processors or associated circuitry. These effects may be experienced during a video conference in the form of poor video quality, increased buffering times, dropped attendance in the conference, and/or the like. A need remains for intelligently managing the field of view of a camera system based on context in the surrounding environment to reduce the processing load when available.

SUMMARY

In accordance with an embodiment, an electronic device is provided that includes a housing, a camera system, one or more display devices, a memory, and one or more processors. The camera system is mounted to the housing and configured to generate image data depicting a surrounding environment. The one or more display devices are coupled to the housing and configurable in multiple different orientations relative to the housing. The memory is configured to store program instructions. The one or more processors are operably connected to the memory and the camera system. The program instructions are executable by the one or more processors to determine a current orientation of the one or more display devices relative to the housing, and determine an effective field of view (FOV) of the surrounding environment based on the current orientation of the one or more display devices. The program instructions are executable by the one or more processors to perform image analysis on a set of image data generated by the camera system. The set of image data is limited to the effective FOV.

Optionally, the one or more processors may determine the effective FOV by selecting one of multiple preset sizes for the effective FOV based on the current orientation. The multiple preset sizes for the effective FOV may include 180 degrees, 270 degrees, and 360 degrees. The one or more processors may modify a size of the effective FOV in response to detecting a change in the current orientation of the one or more display devices.

Optionally, the one or more processors may perform image analysis only on the set of image data generated by the camera system within the effective FOV by at least one of (i) controlling the camera system to not generate image data of the surrounding environment outside of the effective FOV, or (ii) filtering out a second set of image data generated by the camera system that depicts at least a portion of the surrounding environment outside of the effective FOV prior to performing the image analysis. The one or more processors may select a camera setting used to generate additional image data within the effective FOV based on the image analysis of the set of image data that is within the effective FOV.

The one or more display devices may include a first display device and a second display device that are independently coupled to the housing and able to at least one of rotate or tilt relative to the housing and to one another to represent the current orientation. The one or more processors may determine the current orientation by determining an orientation angle defined between a first line normal to the first display device and a second line normal to the second display device. The one or more processors may select a first size of the effective FOV based on the orientation angle being within a first threshold range. The one or more processors may select a second size of the effective FOV, which is greater than the first size, based on the orientation angle being within a second threshold range that is discrete from the first threshold range. Optionally, the second size of the effective FOV may be 360 degrees. Optionally, the one or more processors may determine the effective FOV and angularly position the effective FOV based on the current orientation such that effective FOV encompasses respective viewing angles of each of the first and second display devices. The one or more processors may determine the effective FOV to be 360 degrees in response to the current orientation being an opposite display configuration. The one or more processors may determine the effective FOV to be a first value that is less than 360 degrees in response to the current orientation being an elbow display configuration. The one or more processors may determine the effective FOV to be a second value that is less than the first value in response to the current orientation being an extended display configuration.

Optionally, the electronic device may include a sensor mounted to the housing and configured to generated sensor signals indicative of a proximity of the housing to a boundary in the surrounding environment. The one or more processors may determine the effective FOV of the surrounding environment based on the current orientation of the one or more display devices and the proximity of the housing to the boundary.

In accordance with an embodiment, a method is provided that includes determining, via one or more processors of an electronic device, a current orientation of one or more display devices of the electronic device relative to a housing of the electronic device. The one or more display devices are coupled to the housing and configurable in multiple different orientations relative to the housing. The method includes determining, via the one or more processors, an effective field of view (FOV) of the surrounding environment based on the current orientation of the one or more display devices, and performing image analysis on a set of image data generated by a camera system mounted to the housing. The set of image data on which the image analysis is performed is limited to the effective FOV.

Optionally, determining the effective FOV may include selecting one of multiple preset sizes for the effective FOV based on the current orientation of the one or more display devices. Optionally, the method may include detecting a change in the current orientation of the one or more display devices; modifying a size of the effective FOV in response to detecting the change; and performing image analysis on a second set of image data generated by the camera system. The second set of image data may be limited to the effective FOV with the size as modified.

Optionally, the one or more display devices may include a first display device and a second display device that are independently coupled to the housing and able to at least one of rotate or tilt relative to the housing and to one another to represent the current orientation. The method may include angularly positioning the effective FOV based on the current orientation such that the effective FOV encompasses respective viewing angles of each of the first and second display devices. Optionally, determining the effective FOV may include determining the effective FOV to be 360 degrees in response to the current orientation of the first and second display devices being an opposite display configuration; determining the effective FOV to be a first value that is less than 360 degrees in response to the current orientation of the first and second display devices being an elbow display configuration; and determining the effective FOV to be a second value that is less than the first value in response to the current orientation of the first and second display devices being an extended display configuration.

In accordance with an embodiment, a computer program product is provided that includes a non-transitory computer readable storage medium. The non-transitory computer readable storage medium includes computer executable code that is executed by one or more processors to determine a current orientation of one or more display devices of an electronic device relative to a housing of the electronic device. The one or more display devices may be coupled to the housing and configurable in multiple different orientations relative to the housing. The computer executable code may be executed by the one or more processors to determine an effective field of view (FOV) of the surrounding environment based on the current orientation of the one or more display devices; and to perform image analysis on a set of image data generated by a camera system mounted to the housing. The set of image data on which the one or more processors perform the image analysis is limited to the effective FOV.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure provide an electronic device that manages a field of view (FOV) of an environment surrounding a camera system based on an orientation of one or more display devices of the electronic device. The orientation of the display device(s) is used by the electronic device to determine an area of the surrounding environment that includes relevant objects for capturing in image data. For example, the relevant objects may be people that are sitting or standing near the electronic device within a same room as the electronic device. Areas associated with non-relevant objects may lack people, such as including walls, furniture, and/or other structural boundaries. The systems and methods disclosed herein infer the relevant area of the surrounding environment based at least in part on the orientation of the display device(s), and limit an imaging FOV to that relevant area.

Limiting the FOV may reduce the analytical load on the one or more processors that analyze the image data. For example, if the device determines an effective FOV to be half of the full FOV capability of the camera system, then the processors may only have to analyze half of the image data capable of being generating by the camera system. The effect is a 50% reduction in analytical load. The processors may analyze the image data to, for example, detect individual people near the camera system for cropping the image data around the individuals, identifying the individuals based on facial recognition, and/or the like. By enabling a reduced analytical load on the image processors, the embodiments described herein may desirably improve efficiency, accuracy, and/or processing times of the electronic device, may reduce errors and faults committed by the electronic device, and/or may extend the operational lifetime of the image processors or associated circuitry.

The electronic device may be used for collaboration events, which can include video conferencing between local participants proximate to the electronic device (e.g., within the same room) and outside participants that are remote from the electronic device (e.g., not in the same room). The one or more display devices of the electronic device can be used to display images and/or video feeds during the collaboration event to the local participants in the room. The one or more display devices may be selectively configurable in multiple orientations relative to the housing of the electronic device, such as to face towards different directions. The examples disclosed herein may utilize a selected orientation of the display device(s) to infer the positioning of the local participants around the electronic device, and limit the effective FOV for image processing based on the inferred positioning of the local participants. For example, the electronic device may generate image data of the local participants and transmit the image data as one or more video feeds to the devices used by the outside participants, which enables the outside participants to view the faces of the local participants. The electronic device may perform image processing analysis on the image data that is generated by the camera system prior to transmitting the video feeds, such as to crop the image data relative to the local participants and/or perform facial recognition. Determining the effective FOV may reduce the amount of image data for the processors to analyze by limiting the analysis to image data within the effective FOV. Performing the method described herein may not have any noticeable impact on the collaboration event to the users experiencing the event, other than possibly improving the image quality and reducing errors, buffering times, and/or the risk of unintentionally dropping attendance in the collaboration event. The device and method disclosed herein is not limited to collaboration events such as video conferencing applications.

References herein to "machine learning" and "artificial intelligence" refer to algorithms that learn from various automatic or manual feedback, such as observations and/or data. The artificial intelligence algorithms may be adjusted (e.g., trained) over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks (e.g., convolutional neural networks), and/or the like.

References herein to "electronic device", unless specified, shall mean any of various types of hardware devices that perform processing operations and include the components described herein as part of the electronic device. In one or more embodiments, the electronic device may be a collaboration hub device or station, such as a center-of-table imaging device. The collaboration hub device may be designed for video conferencing. In other embodiments, the electronic device may be a server, computer workstation, personal computer (e.g., laptop, desktop, tablet, smartphone, wearable computer, etc.), television, and/or the like.

References herein to "effective FOV" shall mean a field of view of a camera system as determined (e.g., calculated or selected) by one or more processors based at least in part on the orientation of the one or more display devices. Depending on the display device orientation, the effective FOV may be the same as a maximum field of view that the camera system is capable of providing, or may be less than the maximum field of view. The effective FOV refers to the portion of the surrounding environment determined to be relevant for image processing. A value or size of the effective FOV may be characterized in degrees or radians.

Figure 1:
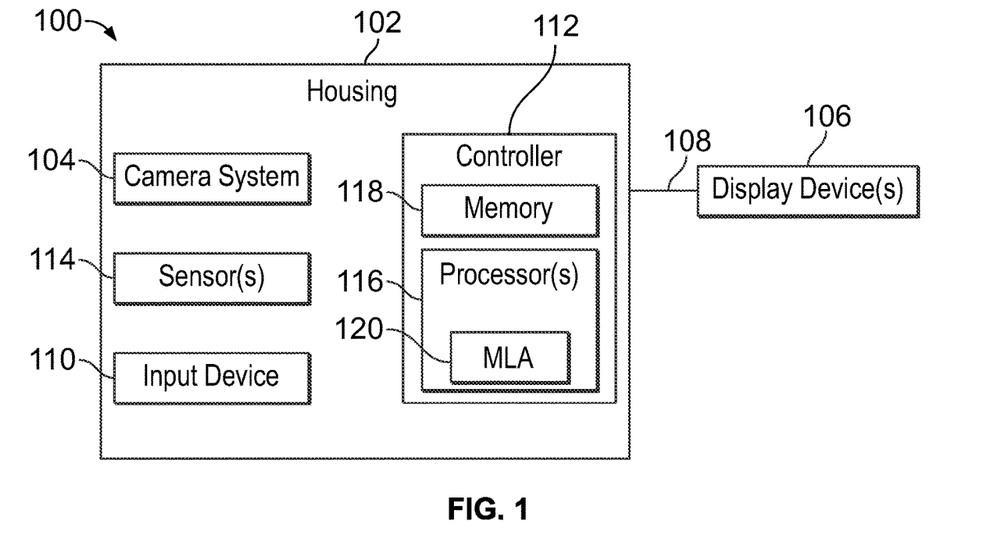
FIG. 1 is a schematic block diagram of an electronic device according to an embodiment.

FIG. 1 is a schematic block diagram of an electronic device 100 according to an example of the present disclosure. The electronic device 100 includes a housing 102, a camera system 104, and one or more display devices 106. The electronic device 100 may also include an input device 110, a controller 112, and one or more sensors 114. The electronic device 100 may have additional components that are not shown in FIG. 1, such as a communication device for transmitting outbound data and receiving inbound data via a network. In an alternative embodiment, the electronic device 100 may lack one or more of the components shown in FIG. 1, such as the sensor(s) 114.

The camera system 104 is mounted to the housing 102. At least some components of the camera system 104 may be contained within the housing 102. One or more lenses or other components of the camera system 104 may at least partially protrude from the housing, while optionally remaining protected by the exterior environment by a transparent, or at least translucent, cover. The camera system 104 may be secured in a fixed position relative to the housing 102. The camera system 104 is designed to generate image data of the environment surrounding the electronic device 100. The camera system 104 may have a wide or ultra-wide FOV that enables capturing more than 180 degrees of the surrounding environment in image data without physically moving or reorienting the camera system. For example, the camera system 104 may be able to generate image data depicting a full 360 degree FOV of the surrounding environment.

The one or more display devices 106 are coupled to the housing 102. For example, each display device 106 may be mechanically connected to the housing 102 via an arm 108 or other linkage. The display device(s) 106 are configurable in multiple different orientations relative to the housing 102. For example, each display device 106 may be configurable by manually rotating the display device 106 about the housing 102 and/or manually tilting the display device 106 relative to the respective arm 108. In another example, reorienting each display device 106 may be remotely controlled by a user providing user inputs to an input device 110 of the electronic device 100. The input device 110 may then generate control signals that are communicated to one or more actuators connected to a linkage between the display device(s) 106 and the housing 102 to cause the display device(s) 106 to rotate and/or tilt. In a first embodiment, the electronic device 100 has two display devices 106. In a second embodiment, the electronic device 100 has only one display device 106. In other embodiments, the electronic device 100 may have at least three display devices 106.

When the electronic device 100 has multiple display devices 106, each of the display devices 106 may be able to rotate and/or tilt relative to the housing 102 and relative to one another. The current orientation of the display device(s) 106 refers to the rotational position and/or tilt position of each display device (s) 106. For example, with two display devices 106, the current orientation is defined by the rotational and/or tilt position of the first display device 106 and the rotational and/or tilt position of the second display device 106, each relative to the housing 102. The multiple display devices 106 may be independently coupled to the housing 102. For example, a first display device 106 may be coupled to the housing 102 at a first location via a first arm 108, and a second display device 106 may be coupled to the housing 102 at a second location via a second arm 108.

Each display device 106 includes a display screen that presents graphical indicia, such as images, shapes, text and symbols, for viewing by one or more observers. The display device 106 may display a graphical user interface (GUI) of an application or website, such as a video conferencing platform's application or website. In an embodiment that includes multiple display devices 106, the display devices 106 may be controlled to function as duplicates, displaying identical graphical indicia as each other, or as a single, extended display screen based on a configuration of the multiple display devices 106 relative to each other.

The electronic device 100 includes a controller 112 that performs some or all of the processing, determination, and control operations described herein to manage the FOV based on display orientation. The controller 112 is operably connected to the other components of the electronic device 100 via wired and/or wireless communication links to permit the transmission of information in the form of signals. For example, the controller 112 may generate control signals that are transmitted to the other components to control operation of the components.

The controller 112 represents hardware circuitry that includes and/or is connected with one or more processors 116 (e.g., one or more microprocessors, integrated circuits, microcontrollers, field programmable gate arrays, etc.). The controller 112 includes and/or is connected with a tangible and non-transitory computer-readable storage medium (e.g., data storage device), referred to herein as memory 118. The memory 118 may store programmed instructions (e.g., software) that are executed by the one or more processors 116 to perform the determination, analysis, and/or control operations described herein. The programmed instructions may include one or more algorithms utilized by the one or more processors 116. For example, one or more algorithms stored in the memory 118 may be used by the processor(s) 116 to determine a current orientation of the one or more display devices 106, determine an effective FOV of the surrounding environment based on the current orientation, and perform image analysis on a set of image data generated by the camera system 104. The set of image data on which the image analysis is performed may be limited to the effective FOV. References herein to the controller 112 may refer to the one or more processors 116 of the controller 112.

The memory 118 may store one or more databases that contain information utilized by the one or more processors 116 to perform the operations described herein. The memory 118 may store additional applications, such as various application program interfaces (APIs) that link to cloud hosting services, for accessing information from remote servers or other devices.

The processor(s) 116 may include and/or implement at least one artificial intelligence (AI) machine learning algorithm 120 ("MLA" in FIG. 1). The machine learning algorithm 120 may be an artificial neural network. The machine learning algorithm 120 may be trained to perform image analysis and classification. In an embodiment, the set of image data generated by the camera system 104 that is within the effective FOV may be input to the machine learning algorithm 120 for image analysis. The processors 116 may limit the image data input to the machine learning algorithm 120 to that image data that is within the effective FOV as determined by the processors 116. For example, any image data that is generated that is outside of the effective FOV may be filtered out by the processors 116 by not inputting that image data to the machine learning algorithm 120. Alternatively, the processors 116 may limit the image data to the effective FOV by controlling the camera system 104 to only generate image data of the surrounding environment that is within the effective FOV. In either case, the net result is that the machine learning algorithm 120 receives a reduced analytical load if the effective FOV is less than the maximum achievable FOV of the camera system. For example, a portion of the surrounding environment is either not imaged, or is imaged but the image data is not supplied to the machine learning algorithm 120.

Upon receipt of the (filtered) set of image data from the processors 116, the machine learning algorithm 120 may perform image analysis on the set of image data associated with the effective FOV. The image analysis may involve object detection, segmentation, object recognition, and/or the like. For example, the machine learning algorithm 120 may detect the presence of people, and may crop the image data based on the detected locations of the people. The machine learning algorithm 120 may perform facial recognition to attempt to determine the identities of the detected people in the room. In an alternative embodiment, the controller 112 does not include or apply any machine learning algorithm, but rather applies classical (e.g., non-AI) image classification and/or segmentation algorithms using the input image data associated with the effective FOV.

The input device 110 is designed to receive user inputs (e.g., selections) from a user that interacts with the electronic device 100. The input device 110 may include or represent a touch sensitive screen or pad, a mouse, a keyboard, a joystick, a switch, physical buttons, and/or the like. A user may actuate the input device 110 to generate input commands that are conveyed to the controller 112 as control signals for providing information to and/or controlling operation of the electronic device 100. For example, the user may use the input device 110 to activate or turn "on" the electronic device 100, select user settings, activate the camera system 102, or the like.

The one or more sensors 114 are operably connected to the controller 112 via wired or wireless connection pathways. The sensor(s) 114 are referred to in the plural, although in an embodiment the electronic device 100 may include only one sensor 114 or no sensors at all. The sensors 114 may generate sensor signals indicative of various parameters measured or detected by the sensors 114. In one example, the sensors 114 may include position sensors used by the controller 112 to determine a current orientation of the display device(s) 106. For example, the position sensors may include Hall Effect sensors incorporated into joints in the linkage mechanism between the display device(s) 106 and the housing 102. A change in an output of a Hall Effect sensor may indicate that the display device 106 has changed positions relative to the arm 108 and/or the housing 102. Other examples of the sensors 114 can include proximity sensors, motion sensors, infrared (IR) sensors, and the like.

One or more of the sensors 114 may be used to provide context to the controller 112 about the position of the electronic device 100 in a room and/or the presence of activity in the room. For example, a proximity sensor may detect that the electronic device 100 is within 1 meter (m) of a wall or other boundary. In that case, the controller 112 may determine that no actors (e.g., no people actively viewing the display device(s) 106) are between the electronic device 100 and the wall, so the controller 112 can orient the effective FOV to at least partially avoid the portion of the surrounding environment between the electronic device 100 and the wall. In another example, the sensors 114 may include a motion sensor used by the controller 112 to detect the presence of activity in the room around the electronic device 100. For example, in response to detecting the presence or absence of actors in the room based on the sensor signals generated by the motion sensor, the controller 112 may take one or more control actions. The control actions may include activating the camera system 104 to begin generating image data in response to detecting the presence of actors in the room. In another example, the controller 112 may activate the electronic device 100, including the display device(s) 106 from a sleep mode upon detecting actors present. Conversely, the controller 112 may deactivate the camera system 104 or initiate the sleep mode for the electronic device 100 in response to an absence of motion in the room for at least a threshold period of time. Optionally, a sensor 114 may be used to assist the controller 112 with distinguishing between objects that are actually present in the surrounding environment and objects that are depicted on the walls and/or display devices. For example, the controller 112 may use the sensor data to determine that a face is two-dimensional, which indicates that the face is not a three-dimensional person actually present in the room.

Figure 2:
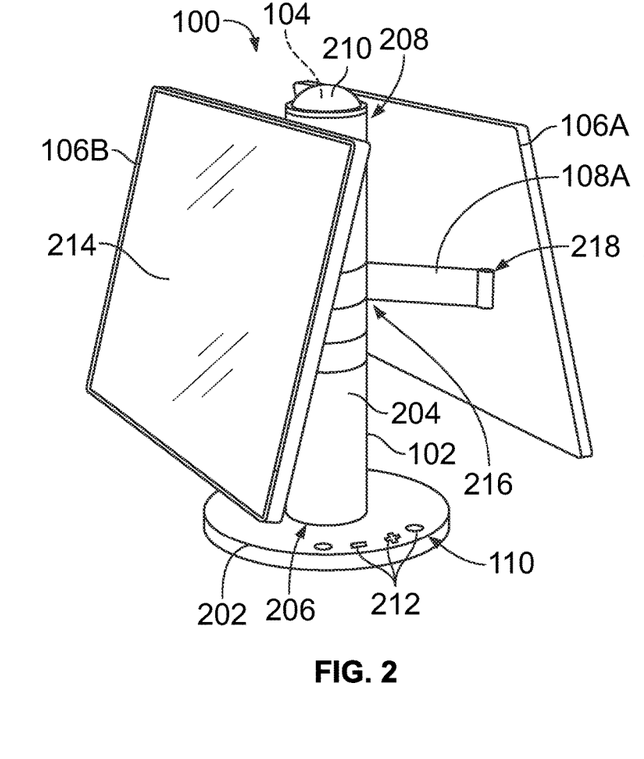
FIG. 2 illustrates the electronic device according to an embodiment.

FIG. 2 illustrates the electronic device 100 according to an embodiment. The electronic device 100 shown in FIG. 2 represents one possible form of the electronic device 100. The electronic device 100 may be a center-of-table collaboration hub device. The electronic device 100 in FIG. 2 has a first display device 106A and a second display device 106B that are independently coupled to and configurable relative to the housing 102. The housing 102 may include a base 202 and an upright portion or trunk 204 coupled to the base 202 and extending upward from the base 202. The trunk 204 may be an elongated column, and optionally has a cylindrical shape. The trunk 204 may extend from a bottom end 206 at the base 202 to a top end 208 opposite the bottom end 206. The camera system 104 may be mounted to the trunk 204 at the top end 206. The camera system 104 may digitally view the surrounding environment above the display devices 106A, 106B through a convex cover 210. The base 202 optionally includes physical buttons 212 which represent part of the input device 110. Optionally, display screens 214 of the display devices 106A, 106B may be touch sensitive such that the display screens 214 represent another part of the input device 110.

Figure 7:
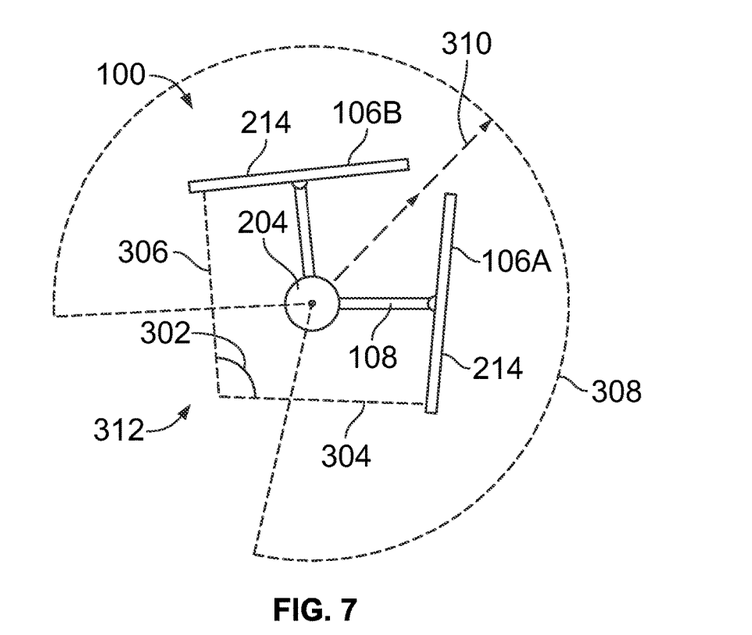
FIG. 7 is a top-down view of the electronic device according to an embodiment.

In an embodiment, the first display device 106A is mechanically coupled to the trunk 204 via a first arm 108A, and the second display device 106B is mechanically coupled to the trunk 204 via a second arm 108B (shown in FIG. 7). The arms 108A, 108B may be independently secured to the trunk 204 at different locations. The arms 108A, 108B may be rigid beams or bars. In an embodiment, the arms 108A, 108B are able to rotate about the trunk 204, which enables the display devices 106A, 106B to swivel around the trunk 204 relative to the housing 102 and to each other. Each of the arms 108A, 108B connects to the trunk 204 at a respective proximal joint 216 and connects to the respective display device 106A, 106A at a respective distal joint 218. In an embodiment, both the proximal joints 216 and the distal joints 218 enable relative rotation/pivoting of the corresponding components relative to each other to reorient the display devices 106A, 106B relative to the housing 102. In a first alternative embodiment, only the distal joint 218 or the proximal joint 216, but not both, enable relative rotation/pivoting of the corresponding components. In a second alternative embodiment, the arms 108A, 108B may be segmented and include one or more pivot and/or rotation joints along the length of the arms 108A, 108B, spaced apart from the proximal and distal joints 216, 218. The arms 108A, 108B and the various joints used to mechanically couple the display devices 106A, 106B to the trunk 204 represent linkage mechanisms that permit reorientation of the display devices 106A, 106B as desired. In an embodiment, the display devices 106A, 106B are manually reoriented by grasping and moving the display devices 106A, 106B without moving the housing 102. The linkage mechanisms may be designed to retain manually-implemented orientations of the display devices 106A, 106B (e.g., without retreating back to a designated orientation).

Figure 3:
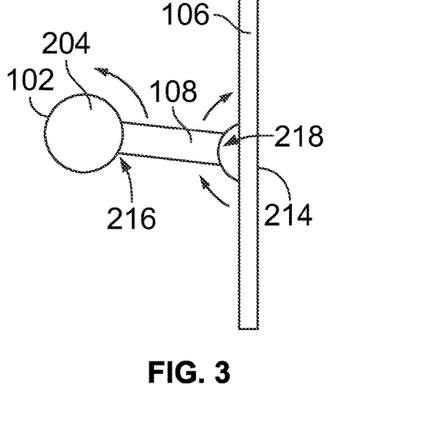
FIG. 3 illustrates a top-down view of the electronic device showing only one display device, one arm, and a trunk of a housing according to an embodiment.

FIG. 3 illustrates a top-down view of the electronic device 100 showing only one of the display devices 106, one of the arms 108, and the trunk 204 of the housing 102. In an embodiment, the proximal joint 216 between the arm 108 and the trunk 204 enables the display device 106 to swivel about the trunk 204 within a plane. The swivel function permits actors in the room (e.g., participants in a collaboration event) to rotate the display device 106 to generally face towards the actors. Optionally, the proximal joint 216 may enable the display device 106 to rotate 360 degrees about the trunk 204. The display joint 218 between the arm 108 and the display device 106 may enable the display device 106 to tilt or pivot relative to the arm 108. The tilt function permits the actors to tune the orientation of the display device 106 to more accurately face towards the actors. The tilt and swivel functions, in tandem, may also permit the two display devices 106A, 106B as shown in FIG. 2 to attain multiple specific orientation configurations, as described with reference to FIGS. 4-6.

Figure 4A:
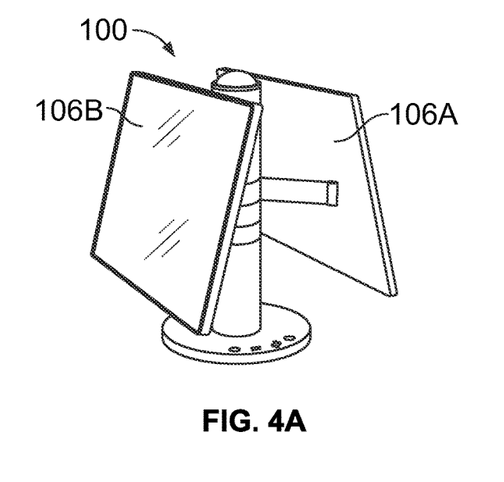
FIG. 4A illustrates the electronic device with the display devices in a first orientation referred to as an opposite display configuration according to an embodiment.
Figure 4B:
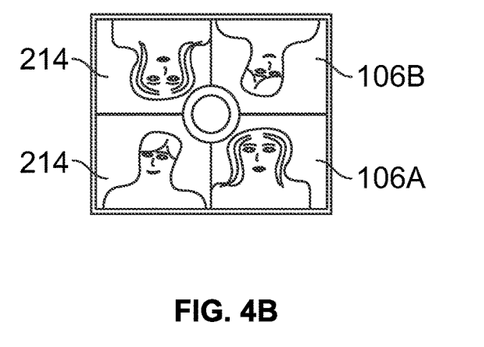
FIG. 4B is a schematic illustration showing example content on the display devices when in the opposite display configuration.

FIG. 4A illustrates the electronic device 100 with the display devices 106A, 106B in a first orientation according to an embodiment. The first orientation is referred to herein as an opposite display configuration because the display devices 106A, 106B generally face in opposite directions. FIG. 4B is a schematic illustration showing example content on the display devices 106A, 106B when in the opposite display configuration. The controller 112 may display the same content on both display screens 214 of the devices 106A, 106B. The content in this example includes a first image or video feed showing a man and a second image or video feed showing a woman. The display devices 106A, 106B face in generally opposite directions, so displaying identical content allows the actors on both sides of the electronic device 100 to view the same content via different display devices 106A, 106B.

Figure 5A:
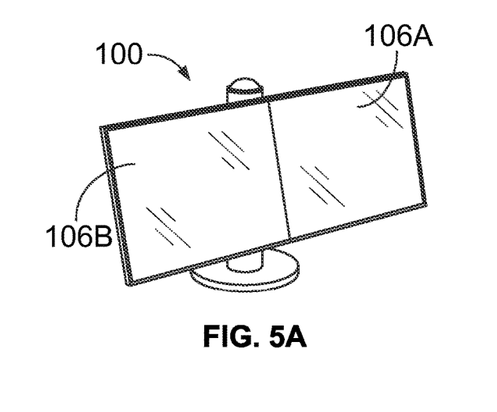
FIG. 5A illustrates the electronic device with the display devices in a second orientation referred to as an extended display configuration according to an embodiment.
Figure 5B:
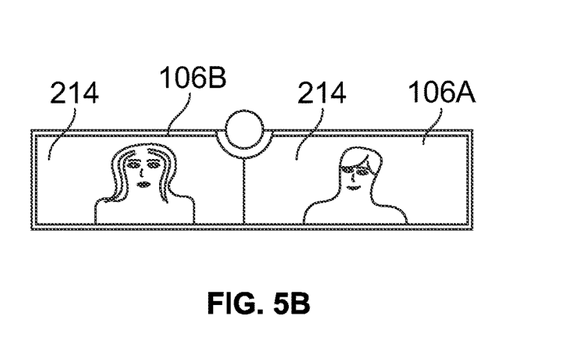
FIG. 5B is a schematic illustration showing example content on the display devices when in the extended display configuration.

FIG. 5A illustrates the electronic device 100 with the display devices 106A, 106B in a second orientation according to an embodiment. The second orientation is referred to herein as an extended display configuration because the display devices 106A, 106B generally face in the same direction and are adjacent to one another to effectively define a single, widescreen display. FIG. 5B is a schematic illustration showing example content on the display devices 106A, 106B when in the extended display configuration. In the extended display configuration, the controller 112 may display different content on the two display screens 214 because the two display screens 214 are controlled to function as a single, widescreen display to be view in tandem by the same actors in the surrounding environment. For example, the image or video feed showing the man is displayed on the first display device 106A, and the image or video feed showing the woman is displayed on the second display device 106B. This enables the images and/or video feeds to be displayed in larger size relative to showing both on the same display screen 214.

Figure 6A:
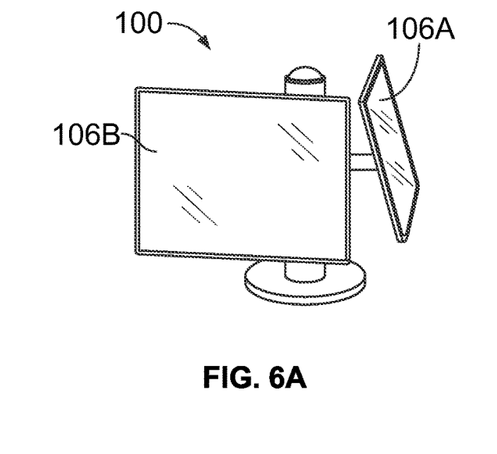
FIG. 6A illustrates the electronic device with the display devices in a third orientation referred to as an elbow display configuration according to an embodiment.
Figure 6B:
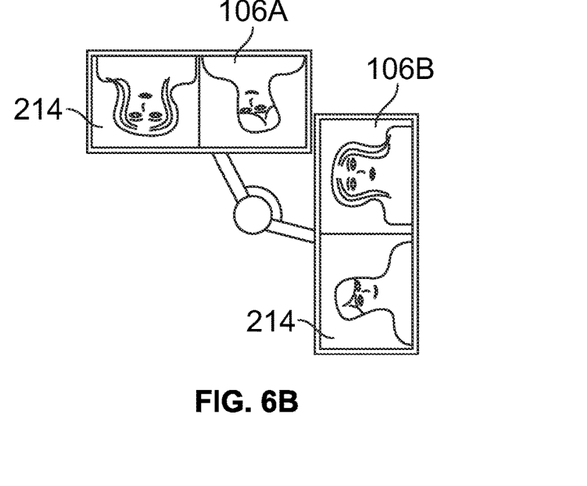
FIG. 6B is a schematic illustration showing example content on the display devices when in the elbow display configuration.

FIG. 6A illustrates the electronic device 100 with the display devices 106A, 106B in a third orientation according to an embodiment. The third orientation is referred to herein as an elbow display configuration because the display devices 106A, 106B are oriented to effectively define an elbow joint between the display devices 106A, 106B. FIG. 6B is a schematic illustration showing example content on the display devices 106A, 106B when in the elbow display configuration. The opposite display orientation, extended display orientation, and elbow display orientation may be attained by manually moving the display devices 106A, 106B and/or electronically controlling actuated movement of the display devices 106A, 106B. The controller 112 may display the same content on both display screens 214 of the devices 106A, 106B, similar to the opposite display configuration. Some actors may not be able to view both display screens 214, so the controller 214 shows identical content on each. The actuated movement of the display devices 106A, 106B may be controlled by a user manipulating the input device 110 of the electronic device 100 and/or by manipulating a software application on a user device, such as a smartphone, to input user commands that are communicated to the electronic device 100.

The controller 112 of the electronic device 100 manages the FOV by determining a current orientation of the display devices 106. Determining the current orientation may be relatively simple when the display devices 106 are electronically controllable to achieve multiple preset configurations, such as the configurations shown in FIGS. 4-6. For example, upon receiving a user input that commands a specific configuration, the controller 112 may generate control signals to one or more actuators that physically reorient the display device(s) 106 to achieve the selected configuration. The position sensors 114 may be used by the controller 112 to confirm that the selected configuration is achieved.

In an example in which the display devices 106 are manually positionable, the mechanical linkage mechanisms between the display devices 106 and the housing 102 may designed to only lock into place in certain specific positions due to detents or the like at the joints 216, 218. For example, the display devices 106A, 106B shown in FIGS. 2 through 6 may be able to lock into certain "stop" positions that enable forming at least the three specific configurations shown in FIGS. 4 through 6. The position sensors 114 can indicate to the controller 112 which detents are being used by each of the display devices 106A, 106B, and the controller 112 determines the current orientation based on the combination of position data. The number of specific stop positions present may be greater or fewer than three in other embodiments.

The controller 112 determines an effective FOV of the surrounding environment based on the current orientation of the one or more display devices 106. In an embodiment, the effective FOV is selected by the controller 112 to encompass respective viewing angles of each of the display devices 106. For example, each display device 106 is viewable by actors that are disposed within the respective viewing angle of the display device 106. The viewing angle may be approximately 180 degrees extending from the side of the display device 106 that includes the display screen 214. Optionally, a curved display screen 214 may have a viewing angle greater than 180 degrees. The viewing angles of the display devices 106 may be known and stored in the memory 118. In an embodiment, the controller 112 uses the current orientation of the display devices 106 to size and direct the effective FOV such that the effective FOV encompasses the viewing angles of all of the display devices 106. In so doing, the effective FOV is sized and directed to encompass all actors in the surrounding environment that are able to view at least one of the display devices 106.

In an embodiment, the controller 112 may determine the effective FOV by selecting one of multiple preset sizes for the effective FOV based on the current orientation. In an example, the controller 112 may first determine which configuration the display devices 106A, 106B are in, and then may select a corresponding size of the effective FOV from multiple different preset sizes. The preset sizes and associations between the preset sizes and the configurations or orientations of the display devices 106A, 106B may be stored in the memory 118 and accessed by the controller 112. In an example, the preset sizes for the effective FOV may include 180 degrees, 270 degrees, and 360 degrees. In a first alternative embodiment, the preset sizes may be limited to 180 degrees and 360 degrees. In a second alternative embodiment, there may be more than three preset sizes, such as including values that are multiples of a certain step value (e.g., 45 degrees, 30 degrees, 20 degrees, 10 degrees, or the like). If the step value is 45 degrees, for example, the preset sizes may be 180 degrees, 225 degrees, 270 degrees, 315 degrees, and 360 degrees.

In an example, in response to determining that the current orientation of the display devices 106A, 106B is the opposite display configuration shown in FIG. 4A, then the controller 112 may determine the effective FOV to be 360 degrees. For example, actors may be seated on opposite sides of a table such that the actors on one side view the screen 214 of the first display device 106A and the actors on the other side view the screen 214 of the second display device 106B. In this case, the effective FOV is selected to be large, such as the maximum achievable FOV of the camera system. In an embodiment, the camera system 104 is capable of providing 360 degree FOV, so 360 degrees is selected as the effective FOV.

In response to the current orientation being the extended display configuration shown in FIG. 5A, the controller 112 may determine the effective FOV to be a value that is less than the maximum achievable FOV. For example, if the maximum achievable FOV is 360 degrees, then in the extended display configuration, the controller 112 is programmed to select a preset value that is less than 360 degrees. In an embodiment, the preset value associated with the extended display configuration is 180 degrees. The actor or actors viewing the screens 214 of the display devices 106A, 106B in the extended display configuration may all be on the same side of the electronic device 100, such as seated on the same side of a table. In this case, the effective FOV can be reduced because no actors are able to view the display screens from the other side of the electronic device 100. There would be no reason to perform image analysis on image data depicting that dead zone area of the surrounding environment which is void of relevant actors. Performing image analysis on 360 degrees of image data when the displays are in the extended display configuration would unduly increase the analytical load.

In response to the current orientation being the elbow display configuration shown in FIG. 6A, the controller 112 may determine the effective FOV to be a preset value that is between the maximum achievable value and the value associated with the extended display configuration. In an embodiment, the size of the effective FOV associated with the elbow display configuration is 270 degrees. The actors viewing the display devices 106A, 106B may not be located along only one side of the electronic device 100, so the effective FOV is not limited to 180 degrees. Still, there is a relatively small dead zone area behind the display devices 106A, 106B from which no actor is able to see any of the display screens 214, so there is no need to analyze a full 360 degree FOV. The controller 112 may be programmed to select a preset size that is an intermediate value between 180 degrees and the maximum achievable value (e.g., 360 degrees), which in this example is 270 degrees.

Returning now to the discussion about determining the current orientation of the display devices, in another example the controller 112 may determine angular orientations of the individual display devices 106 and determine the current orientation based on a combination or comparison of the angular orientations. For example, the display devices 106 may each be manually positionable into a multitude of different orientations. The controller 112 may utilize the position sensors 114 and/or the mechanical linkage mechanisms to determine the specific orientation of each display device 106 from the multitude of available orientations. For example, the linkage mechanisms may include various gears at the joints 216, 218, and the gears rotate as the respective display device 106 is swiveled and/or tilted relative to the housing 102. One or more position sensors 114 may be used by the controller 112 to count the number of gear teeth offset from a reference position, as well as the direction of offset of the gear from the reference position. The controller 112 may use an algorithm to transform that number of gear teeth to an angular orientation of each of the display devices 106A, 106B. The combined angular orientations of the display devices 106A, 106B represents the current orientation of the display devices 106A, 106B. A similar transformation may be performed without the use of gears, such as by tracking via position sensors 114 the relative positioning of a first marker fixed to the display device 106 and a second marker fixed to the arm 108 at the distal joint 218 and/or the relative positioning of a third marker fixed to the arm 108 and a fourth marker fixed to the housing 102 at the proximal joint 216.

In an embodiment in which the electronic device 100 includes multiple display devices 106, the controller 112 may determine the current orientation by determining an orientation angle that is defined between at least two of the display devices 106. FIG. 7 is a top-down view of the electronic device 100 according to an embodiment. In FIG. 7, the two display devices 106A, 106B have an orientation that is similar to the elbow display configuration shown in FIG. 6A. In an embodiment, the controller 112 may determine the orientation angle 302 between a first line 304 extending normal to the first display device 106A and a second line 306 extending normal to the second display device 106B. The controller 112 may then determine the effective FOV based on the orientation angle 302. The normal lines 304, 306 are lines that are perpendicular to a plane of the respective display screen 214 of the display devices 106A, 106B.

The controller 112 may determine the normal lines 304, 306 using the position data described above. For example, the normal line 304 may be calculated or determined by combining an angular tilt offset of the display device 106A at the distal joint 218 relative to a reference position on the arm 108 with a rotational offset of the arm 108 at the proximal joint 216 relative to a reference position on the trunk 204. The controller 112 may input the offset values into an algorithm or a look-up table to determine the normal line 304, which is representative of the angular orientation of the display device 106A. The same process may be used to determine the normal line 306 of the second display device 106B. The controller 112 may then calculate the orientation angle 302 as the angle defined by the normal lines 304, 306. The orientation angle 302 is indicative of the current orientation of the display devices 106A, 106B.

In an embodiment, the effective FOV determined by the controller 112 may have a variable size that is based on the determined current orientation of the one or more display devices 106. The size of the effective FOV may be continuously variable such that the controller 112 may modify the size of the effective FOV in response to detecting a change in the current display orientation. The variable FOV may have smaller increments between sizes than having only a select number of present FOV sizes to select from. In an example, the controller 112 may determine the effective FOV on 1-degree increments, 2-degree increments, 5-degree increments, 10-degree increments, or the like. With a 2-degree increment, upon detecting a slight change in the current orientation, the controller 112 may adjust enlarge or decrease the size of the effective FOV by as little as 2 degrees.

The controller 112 may use the current orientation of the one or more display devices 106 to determine the effective FOV by inputting a value representing the current orientation into an algorithm or an equation that is designed to output a value (e.g., a size) of the effective FOV. In another example, the controller 112 may access a look-up table that lists different orientation value and corresponding effective FOVs. The controller 112 may select a value for the effective FOV as the effective FOV value in the table that is associated with an orientation value most similar to the determined current orientation of the display device(s) 106. The algorithm, equation, and/or look-up table can be used to provide the variable sized effective FOV that is changed dynamically by the controller 112 upon detecting a modified display orientation. In the illustrated example with two display devices 106A, 106B, the orientation angle 302 between the display devices 106A, 106B can represent the current orientation value that is input into the algorithm or equation, or matched up to the orientation values listed in the look-up table.

In another embodiment, the controller 112 may select a preset size for the effective FOV based on a value of the current orientation of the display device(s) 106. For example, the controller 112 may compare the orientation angle 302 between the display devices 106A, 106B to multiple threshold ranges and select a preset effective FOV based on the specific range that encompasses the orientation angle 302. For example, the memory 118 may store multiple threshold ranges. If the orientation angle 302 is determined to be within a first threshold range, the controller 112 may select a first size of the effective FOV. The controller 112 may select a second size of the effective FOV, which is greater than the first size, if the orientation angle 302 is within a second threshold range. Optionally, this trend may be extended to include a third threshold range associated with a third size of the effective FOV, and so forth.

In an example, the first threshold range may include angles less than and equal to 45 degrees (e.g., 0 to 45 degrees), and the size of the effective FOV associated with the first threshold range is 180 degrees. Thus, if the orientation angle is determined to be no greater than 45 degrees, then the effective FOV is selected as 180 degrees. The orientation angle may fall within this range when the display devices are generally facing in the same direction, including the extended display configuration. When the display devise 106A, 106B are coplanar, the orientation angle may be 0, which is included within the first threshold range.

In another example, a second threshold range may include angles greater than 45 degrees up to 135 degrees), and the size of the effective FOV associated with the first threshold range is 270 degrees. Thus, if the orientation angle is determined to be above 45 up to 135 degrees, then the effective FOV is selected as 270 degrees. The orientation angle may fall within this range when the display devices are generally facing in different, though adjacent directions, such as in the elbow display configuration. For example, in FIG. 7, the orientation angle 302 may be calculated to be about 105 degrees. The controller 112 may determine that the orientation angle 302 is within the second threshold range, and select 270 degrees as the size of the effective FOV.

The memory 118 may store a third threshold range that includes angles greater than 135 degrees. If the orientation angle 302 is determined to be greater than 135 degrees, the controller 112 may select 360 degrees as the size of the effective FOV. The number of threshold ranges as well as the size of each threshold range (e.g., the boundary values) may be varied according to application specific parameters and/or user settings. Furthermore, the amount of preset effective FOV values stored in the memory 118 as well as the values of the present effective FOVs may be varied according to application specific parameters and/or user settings. For example, there may be ten threshold ranges that are associated with ten different sizes for the effective FOV, such that the controller 112 selects one of the ten effective FOV sizes based on the determined orientation angle 302.

In an embodiment, if the controller 112 determines the effective FOV to have a size/value that is less than 360 degrees, the controller 112 may angularly position or direct the effective FOV based on the current orientation of the display device(s) 106. As described above, the effective FOV may be angularly positioned to encompass the respective viewing angles of the individual display devices 106. In FIG. 7, the controller 112 may direct the effective FOV towards an interface or area that is between the two display devices 106A, 106B. The effective FOV is shown as the area range defined by the dotted line 308. The size of the effective FOV 308 may be 270 degrees, as determined based on the orientation angle 302. The controller 112 may center the effective FOV 308 along the dashed line 310 which extends between the two display devices 106A, 106B. The area 312 of the surrounding environment is outside of the effective FOV 308. The area 312 corresponds to a dead zone in which no actors would be able to view the display screens 214 of the devices 106A, 106B.

If there is only one display device 106, the controller 112 would not be able to calculate an orientation angle, but would still be able to determine the orientation of the display device 106 relative to the housing 102 using position data as described above. The controller 112 may have a default size for the effective FOV of 180 degrees or a similar value that is based on the viewing angle of the display screen 214. The controller 112 may only modify the size of the effective FOV based on other context in the environment, such as to reduce a size of the effective FOV in response to detecting a wall or other structure within the scope of the default effective FOV which would prevent any actors from being present in that portion of the environment. The controller 112 may angularly position or direct the effective FOV such that a center of the effective FOV points towards the display device 106.

In an embodiment in which there are three display devices 106, the controller 112 may perform a similar process as described above. For example, if the controller 112 determines that the display devices 106 are spread 120 degrees apart from one another in the current orientation, the controller 112 may then select the effective FOV to be 360 degrees. If the current orientation is instead determined to be similar to the elbow display configuration, with a middle display device 106 generally oriented perpendicular to two display devices 106 on either side of the middle device 106, the controller 112 may select the effective FOV to be 270 degrees and direct the effective FOV to be centered towards the middle display device 106.

In an embodiment, after determining the effective FOV, the controller 112 performs image analysis on a set of image data generated by the camera system 104. The set of image data is limited to the effective FOV 308. For example, the image analysis may not be performed on image data that is outside the effective FOV 308. In an embodiment, the controller 112 may control the camera system 104 to only generate image data of the surrounding environment within the confines of the effective FOV 308, such that no image data is generated of the dead zone 312. Depending on the type of camera system 104, the controller 112 may modify one or more settings of the camera system 104 in order to limit the FOV of the camera system 104. For example, if the camera system 104 includes multiple lenses, the controller 112 may activate only a subset of the lenses or deactivate a second subset of the lenses for generating the image data such that not all of the lenses are used to generate image data.

Alternatively, the camera system 104 may generate image data of the entire 360 degree surrounding environment, and the controller 112 filters out a second set of image data that depicts a least a portion of the surrounding environment outside of the effective FOV 308 prior to performing the image analysis. For example, the controller 112 may segregate a first set of image data that is within the effective FOV 308 from a second set of image data within the dead zone 312. The controller 112 may only input the first set of image data associated with the effective FOV 308 into the machine learning algorithm 120 for image analysis, such that no image analysis is performed on the second set of image data associated with the dead zone 312. This function reduces the analytical load on the machine learning algorithm 120 or other processing components which perform the image analysis by reducing the amount of image data to analyze.

In an embodiment, the controller 112 may take one or more control actions based on the image analysis that is performed on the set of image data associated with the effective FOV 308. For example, the controller 112 may select a camera setting based on the image analysis, and the camera setting may then be used by the camera system 104 to generate additional image data within the effective FOV. The camera setting may include exposure settings, focal settings, and/or the like. By essentially ignoring the portion of the surrounding environment outside of the effective FOV, the controller 112 may modify camera settings based only on the light conditions within the relevant portion of the surrounding environment.

In an embodiment, the controller 112 may detect a change in the current orientation of the display device(s) 106, and may modify the size of the effective FOV in response to detecting the change. For example, the controller 112 may use a change in the signal data output by a position sensor 114 as a trigger indicating repositioning of one or more of the display device(s) 106. The controller 112 may then determine the updated current orientation and then the effective FOV based on the updated current orientation, as described above.

Figure 8:
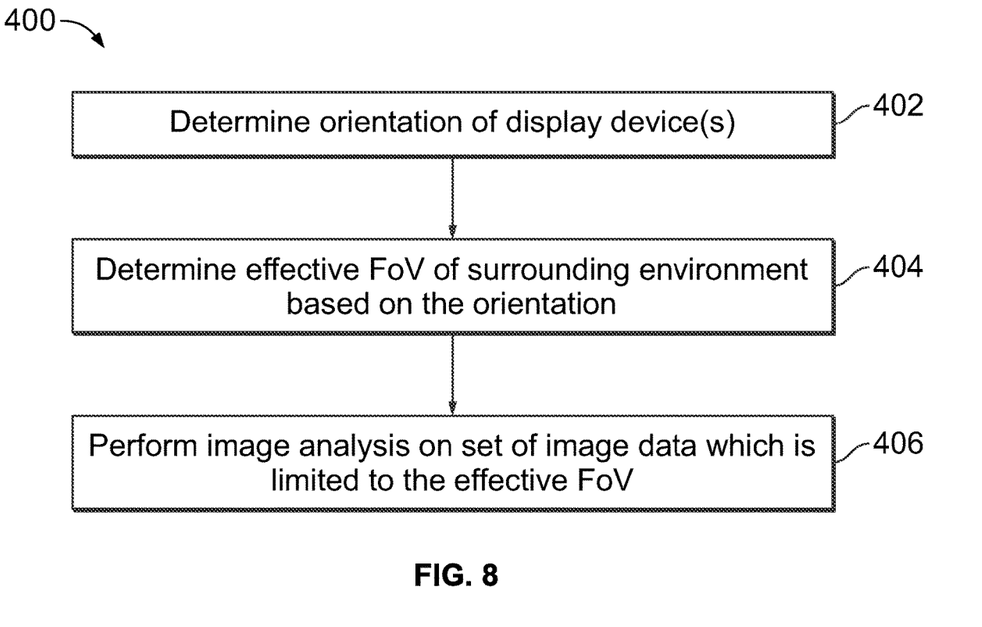
FIG. 8 is a flow chart of a method of managing a field of view based on display orientation according to an embodiment.

FIG. 8 is a flow chart 400 of a method of managing a field of view based on display orientation according to an embodiment. The method may be performed by the controller 112, such as the one or more processors 116 thereof. Some aspects of the method may be performed by the machine learning algorithm 120 or another computer-based model. The method optionally may include at least one additional step than shown, at least one fewer step than shown, and/or at least one different step than shown in FIG. 8.

At step 402, a current orientation of one or more display devices 106 of an electronic device 100 is determined relative to a housing 102 of the electronic device 100. The one or more display devices 106 may be coupled to the housing 102 and configurable in multiple different orientations relative to the housing 102.

At step 404, an effective FOV (e.g., the effective FOV 308 in FIG. 7) of the surrounding environment is determined based on the current orientation of the one or more display devices 106. The effective FOV may be determined by selecting one of multiple preset sizes for the effective FOV based on the current orientation.

Optionally, there are multiple display devices 106. The effective FOV may be determined to be 360 degrees in response to the current orientation of the first and second display devices being an opposite display configuration. The effective FOV may be determined to be a first value that is less than 360 degrees in response to the current orientation of the first and second display devices being an elbow display configuration. The effective FOV may be determined to be a second value that is less than the first value in response to the current orientation of the first and second display devices being an extended display configuration. The first value may be 270 degrees, and the second value may be 180 degrees. The method may include angularly positioning the effective FOV based on the current orientation. The effective FOV may be angularly positioned such that the effective FOV encompasses respective viewing angles of each of the display devices.

At step 406, image analysis is performed on a set of image data generated by a camera system 104 mounted to the housing 102. The set of image data, on which the image analysis is performed, may be limited to the effective FOV. The image analysis may involve inputting the set of image data to a machine learning algorithm 122 that is trained to perform object detection and cropping of the image data based on the objects detected. The machine learning algorithm 122 optionally may be trained to perform object recognition, such as facial recognition on detected people in the image data, for identification purposes. Upon cropping the image data, the method may include transmitting at least one cropped image or video feed to a remote server or other computer device. For example, multiple cropped feeds may be generated for multiple different actors (e.g., people) present in the effective FOV of the camera system 104. Optionally, the method may include transmitting tags or metadata with the cropped feeds, where the tags or metadata include identification information that describes the specific actor depicted in one or more of the feeds.

The method may include detecting a change in the current orientation of the one or more display devices 106, and then modifying a size of the effective FOV in response to detecting the change in the current orientation. The method may include performing image analysis on a second set of image data generated by the camera system 104, where the second set of image data is limited to the effective FOV with the size as modified.

The electronic device and method of managing FOV automatically based on display orientation described herein may reduce the analytical/computational load on the processing components that perform image analysis and avoid forcing a user to manually select when to change a FOV mode. The device and method described herein can dynamically shift the effective FOV based on the context of use, including the orientation of the display device(s). The processing components can automatically and adaptively focus on a smaller FOV than the maximum FOV achievable by the camera system (e.g., 360 degrees) if the context indicates that the smaller FOV is appropriate. As described herein, the processors may determine the effective FOV according to the display device orientation, the electronic device's physical proximity to boundaries within a space, and/or contextual awareness of activity within the space (e.g., by monitoring motion using a connected sensor). The processing components, such as a machine learning algorithm, may be input image data generated within the effective FOV, and may analyze the image data to detect potential actors to recognize, and then crop the image data based on the potential actors. Reducing the amount of image data input for image analysis reduces the load on the processing components, which enables more efficient and faster processing with fewer errors and faults. The electronic device may be able to consistently transmit appropriately cropped and recognized image data to a desired host (e.g., various unified communications, content creation applications, or the like) by implementing the embodiments described herein.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
a housing;
a camera system mounted to the housing and configured to generate image data depicting a surrounding environment;
one or more display devices coupled to the housing and configurable in multiple different orientations relative to the housing;
a memory configured to store program instructions; and
one or more processors operably connected to the memory and the camera system, wherein the program instructions are executable by the one or more processors to:
determine a current orientation of the one or more display devices relative to the housing;
determine an effective field of view (FOV) of the surrounding environment based on the current orientation of the one or more display devices;
perform image analysis on a set of the image data generated by the camera system, wherein the set of the image data is limited to the effective FOV; and
modify a size of the effective FOV in response to detecting a change in the current orientation of the one or more display devices relative to the housing.

2. The electronic device of claim 1, wherein the one or more processors are configured to determine the effective FOV by selecting one of multiple preset sizes for the effective FOV based on the current orientation.

3. The electronic device of claim 2, wherein the multiple preset sizes for the effective FOV comprise 180 degrees, 270 degrees, and 360 degrees.

4. The electronic device of claim 1, wherein the one or more display devices include a first display device and a second display device that are independently coupled to the housing and able to at least one of rotate or tilt relative to the housing and to one another to represent the current orientation.

5. The electronic device of claim 4, wherein the one or more processors are configured to determine the current orientation by determining an orientation angle defined between a first line normal to the first display device and a second line normal to the second display device, the one or more processors configured to select a first size of the effective FOV based on the orientation angle being within a first threshold range.

6. The electronic device of claim 5, wherein the one or more processors are configured to select a second size of the effective FOV, which is greater than the first size, based on the orientation angle being within a second threshold range that is discrete from the first threshold range.

7. The electronic device of claim 6, wherein the second size of the effective FOV is 360 degrees.

8. The electronic device of claim 4, wherein the one or more processors are configured to determine the effective FOV and angularly position the effective FOV based on the current orientation so that the effective FOV encompasses both a first viewing angle of the first display device and a second viewing angle of the second display device.

9. The electronic device of claim 4, wherein the one or more processors are configured to determine the effective FOV to be 360 degrees in response to the current orientation being an opposite display configuration; the one or more processors are configured to determine the effective FOV to be a first value that is less than 360 degrees in response to the current orientation being an elbow display configuration; and the one or more processors are configured to determine the effective FOV to be a second value that is less than the first value in response to the current orientation being an extended display configuration.

10. The electronic device of claim 1, wherein the one or more processors are configured to perform the image analysis only on the set of the image data generated by the camera system within the effective FOV by at least one of (i) controlling the camera system to not generate image data of the surrounding environment outside of the effective FOV, or (ii) filtering out a second set of the image data generated by the camera system that depicts a portion of the surrounding environment outside of the effective FOV prior to performing the image analysis.

11. The electronic device of claim 1, wherein the one or more processors are configured to select a camera setting used to generate additional image data within the effective FOV based on the image analysis of the set of the image data that is within the effective FOV.

12. The electronic device of claim 1, further comprising a sensor mounted to the housing and configured to generate sensor signals indicative of a proximity of the housing to a boundary in the surrounding environment, wherein the one or more processors are configured to determine the effective FOV of the surrounding environment based on the current orientation of the one or more display devices and the proximity of the housing to the boundary.

13. A method comprising:
determining, via one or more processors of an electronic device, a current orientation of one or more display devices of the electronic device relative to a housing of the electronic device, the one or more display devices coupled to the housing and configurable in multiple different orientations relative to the housing;
selecting, via the one or more processors, one of multiple preset sizes for an effective field of view (FOV) of the surrounding environment based on the current orientation of the one or more display devices; and
performing image analysis on a set of image data generated by a camera system mounted to the housing, wherein the set of image data on which the image analysis is performed is limited to the effective FOV.

14. The method of claim 13, further comprising:
detecting a change in the current orientation of the one or more display devices;
modifying a size of the effective FOV in response to detecting the change; and
performing image analysis on a second set of image data generated by the camera system, the second set of image data being limited to the effective FOV with the size as modified.

15. The method of claim 13, wherein the one or more display devices include a first display device and a second display device that are independently coupled to the housing and able to at least one of rotate or tilt relative to the housing and to one another to represent the current orientation.

16. The method of claim 15, further comprising angularly positioning the effective FOV based on the current orientation so that the effective FOV encompasses both a first viewing angle of the first display device and a second viewing angle of the second display device.

17. The method of claim 15, wherein selecting the one of the multiple preset sizes for the effective FOV comprises:
selecting the effective FOV to be 360 degrees in response to the current orientation of the first and second display devices being an opposite display configuration;

selecting the effective FOV to be a first value that is less than 360 degrees in response to the current orientation of the first and second display devices being an elbow display configuration; and selecting the effective FOV to be a second value that is less than the first value in response to the current orientation of the first and second display devices being an extended display configuration.

18. A computer program product comprising a non-transitory computer readable storage medium, the non-transitory computer readable storage medium comprising computer executable code configured to be executed by one or more processors to:

determine a current orientation of one or more display devices of an electronic device relative to a housing of the electronic device, the one or more display devices coupled to the housing and configurable in multiple different orientations relative to the housing;

determine an effective field of view (FOV) of the surrounding environment based on the current orientation of the one or more display devices;

perform image analysis on a set of image data generated by a camera system mounted to the housing, wherein the set of image data on which the one or more processors perform the image analysis is limited to the effective FOV; and modify a size of the effective FOV in response to detecting a change in the current orientation of the one or more display devices relative to the housing.

* * * * *